United States Patent [19]
Wu et al.

[11] Patent Number: 5,448,822
[45] Date of Patent: Sep. 12, 1995

[54] METHOD OF MAKING A THIN FILM MAGNETIC HEAD HAVING MULTI-LAYER COILS

[75] Inventors: Andrew L. Wu, Shrewsbury; Paul J. Duval, Lexington, both of Mass.

[73] Assignee: Quantum Corporation, Milpitas, Calif.

[21] Appl. No.: 29,125

[22] Filed: Mar. 10, 1993

[51] Int. Cl.$^6$ ............................................. G11B 5/42
[52] U.S. Cl. ...................................... 29/603; 427/116; 430/324; 430/326
[58] Field of Search ............... 29/603; 427/116, 131, 427/132; 430/324, 326

[56] References Cited

U.S. PATENT DOCUMENTS 3,685,144  8/1972  Trimble .................................. 29/603
4,684,438  8/1987  Lazzari ............................. 29/603 X

OTHER PUBLICATIONS

Holger Moritz, *IEEE Transactions on Electron Devices,* vol. ED-32, No. 3, Mar. 1985, 672–676, "Optical Single Layer Lift-Off Process".

M. Hatzakis et al., *IBM J. Res. Develop., 24(4),* Jul., 1980, 452–460, "Single-Step Optical Lift-Off Process".

M. Spak, et al., As presented at: Seventh International Technical Conference on Photopolymers, Ellenville, N.Y., "Mechanism and Lithographic Evaluation of Image Reversal in AZ 5214 Photoresist".

*Primary Examiner*—Carl E. Hall
*Attorney, Agent, or Firm*—David B. Harrison

[57] ABSTRACT

A method of making a thin film magnetic head having multi-layer coils wherein a raised insulative photoresist spiral pattern having undercut sidewalls is formed. Two layers of coils are fabricated simultaneously by evaporating metal onto the upper surface of the spiral pattern and in spaces between the pattern. The cross-section of the bottom coil decreases in width with an increase in height. The coils are insulated from each other with a layer of insulative photoresist.

27 Claims, 3 Drawing Sheets

METHOD OF MAKING A THIN FILM MAGNETIC HEAD HAVING MULTI-LAYER COILS

BACKGROUND OF THE INVENTION

Thin-film magnetic heads are used to perform both "write" and "read" operations on magnetic medias. In general, a thin-film magnetic head consists of a core of ferromagnetic material, such as permalloy, with a multi-turn coil wrapped around the core. A magnetic flux is induced in the head during "write" operations to magnetize underlying memory storage media. During "read" operations, magnetized storage media is passed by the head, inducing an electrical voltage in the coil. The induced level of electrical voltage is increased by the number of flux interactions between the permalloy and the coil. Traditionally, the increase in the number of flux interactions has been accomplished by adding more turns into the coil, by reducing the coil pitch, or adding more layers of coils. Today, a typical thin-film inductive head needs a minimum of two layers of coils to meet the performance requirements.

Typically, a multi-layer coil is fabricated by forming a first metallic coil on a substrate through either a plating process or a deposition and photo engraving process. A layer of photoresist is then spun onto the first coil and hard baked in a vacuum to insulate the first coil. Subsequent coil layers are formed over the first coil by repeating the same processes to obtain a multi-layer coil structure.

The processing time to produce and insulate each coil layer is lengthy. The processing time further increases as the number of coil layers increase. An increase in the number of coil layers also increases the process complexity. The difficulty in manufacturing a consistent multi-layer coil pattern results in low yields and higher manufacturing costs.

Accordingly, there is a continuing need for a thin-film magnetic head having multi-layer coils which can be easily produced with reduced manufacturing times and costs as well as increased manufacturing yields.

SUMMARY OF THE INVENTION

The present invention relates to a method of forming a thin-film magnetic head having a multi-layer coil and the resultant magnetic head so formed. In accordance with the method of the invention, the magnetic head is made by first forming an insulative resist layer, such as photoresist, over a substrate. Selected areas of the upper surface of the resist layer are exposed to light, which renders predetermined areas of the resist layer more soluble than other areas. The solubility varies across the thickness of the resist layer. The more soluble areas of the resist layer are then dissolved to produce a raised, substantially convoluted pattern of resist at predetermined locations where the windings for the top coil are to be formed. Spaces are left between the raised portions. The sidewalls of the pattern have a negative slope because of the varying solubility with thickness. In other words, the resist pattern varies in width from larger to smaller from the upper surface of the resist layer to the lower surface.

Next, coil metallization is deposited over the pattern such that a bottom coil is formed on the lower convoluted surface in the space between the resist pattern and a top coil is formed on the upper convoluted surface of the resist pattern. Because of the negative slope of the sidewalls, a void occurs in which no metallization is formed, between the upper and lower coils. A low viscosity resist insulator is deposited to fill in the voids between the bottom coil and the sidewalls of the pattern. Finally, an insulative layer is deposited over the metallization which makes up the top and bottom coils.

By forming two coil layers with one metallization process, the number of manufacturing steps required to produce a multi-layer coil structure is reduced, thereby reducing manufacturing time and costs.

The top and bottom coils wind in the same direction and are wrapped about a core of ferromagnetic material. The top coil windings are aligned between the bottom coil windings. A jumper wire is used to electrically connect the top and bottom coils in electrical series.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 2:
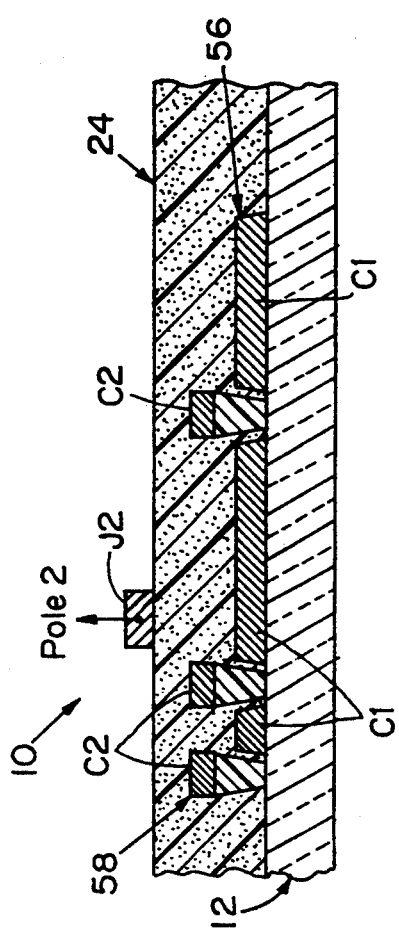
FIG. 2 is a cross-sectional view of the present invention thin film magnetic head taken along 2—2.
Figure 3:
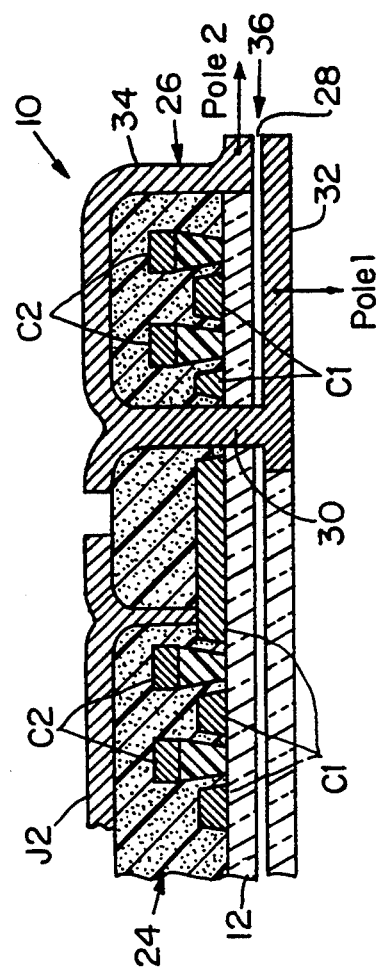
FIG. 3 is a cross-sectional view of the present invention thin film magnetic head taken along 3—3.
Figure 1:
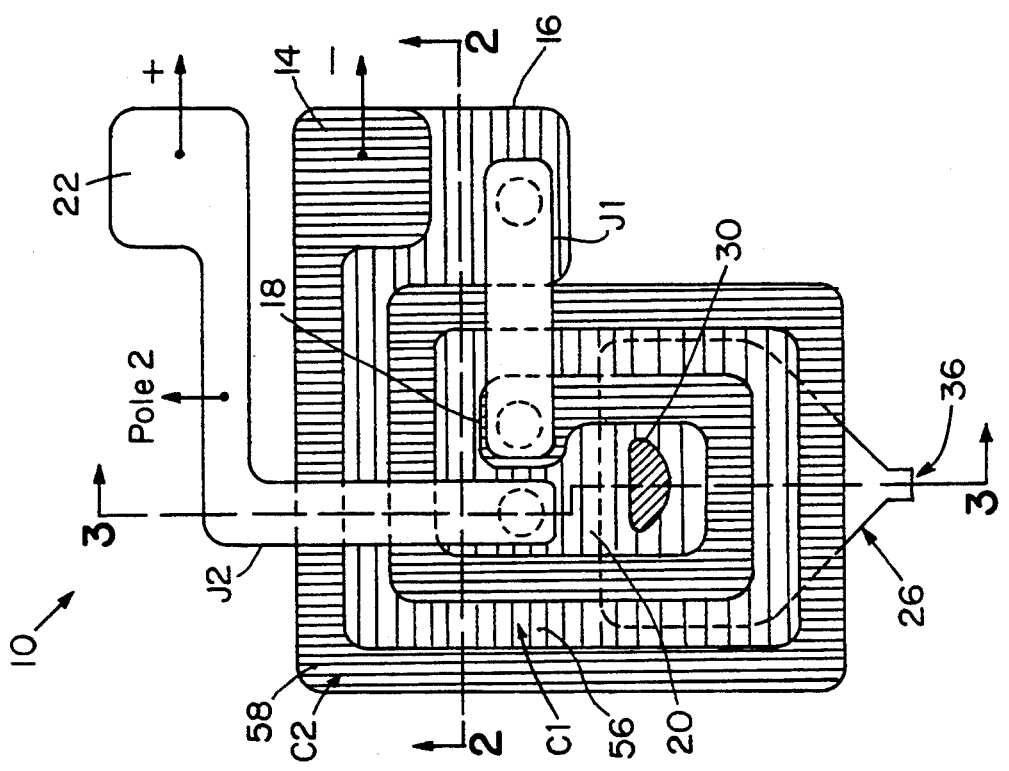
FIG. 1 is a plan view of the present invention thin film magnetic head having multi-layer coils.

Referring now to FIGS. 1 through 3, a preferred embodiment of a thin-film magnetic head 10 made in accordance with the invention will be described in connection therewith. Head 10 is formed of two coils C1 and C2 having spiral or convoluted windings 56 and 58 respectively. The windings 58 of coil C2 are disposed above and between the windings 56 of Coil C1. An insulating photoresist layer 24 separates and covers coils C1 and C2 to electrically insulate the coils from each other. Coils Cl and C2 are wound in the same direction so that the magnetic fields of those coils do not cancel each other out. In the preferred embodiment, the insulative resist is a photoresist such as AZ5218, AZ1370, AZ1375 or AZP4400 which is deposited over coils C1 and C2. Preferably the coils are made of copper but can also be made of other electrically conductive materials such as gold or aluminum. A jumper wire J1 electrically connects an outer end 16 of coil C1 to the inner end 18 of coil C2, thereby connecting coils C1 and C2 in electrical series. Conductive pads 14 and 22 are formed at the remaining ends of coils C2 and C1 respectively. An electrical power source (not shown) is coupled across pads 14 and 22. A jumper wire J2 electrically connects pad 22 to the inner end 20 of coil C1. Jumper wires J1 and J2 are preferably made of copper but alternatively can be made of other conductive materials such as gold or nickel iron.

The windings of coils C1 and C2 wrap about leg 30 of horseshoe magnet 26. Leg 30 connects the upper portion 34 of pole 2 to the lower portion 32 of pole 1. A gap 28 separates upper portion 34 from lower portion 32 at region 36.

Figure 4:
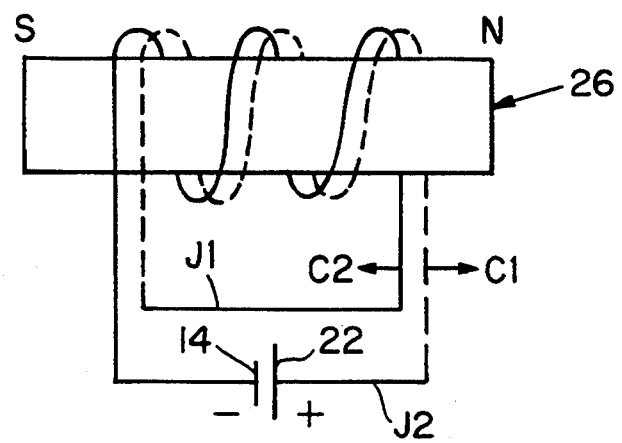
FIG. 4 schematically depicts the top and bottom coils wrapped about the magnet.

When coils C1 and C2 are energized during a "write" operation, a magnetic field having north and south poles forms around horseshoe magnet 26 as depicted in FIG. 4. Storage media passing by region 36 of magnet 26 becomes "written" upon or magnetized by the magnetic field. Conversely, in a "read" operation, "written" or magnetized storage media is passed near region 36 of horseshoe magnet 26 producing electrical voltages across coils C1 and C2.

FIGS. 5a-5d depict the method of making coils C1 and C2 of the present invention thin film magnetic head 10.

Figure 5A:
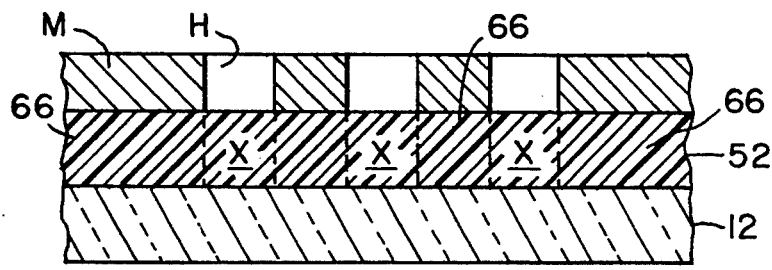
FIG. 5a is a cross-sectional view of a layer of photoresist deposited on the substrate and masked for exposure to light.
Figure 5B:
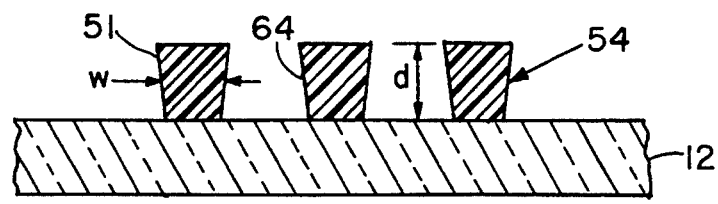
FIG. 5b is a cross-sectional view of the pattern of photoresist on the substrate.

In FIG. 5a, a layer of photoresist 52 is spin coated onto insulative layer 12 using a spin coater. Photoresist 52 is preferably a negative or image reversal photoresist such a AZ5218. The photoresist layer 52 is then stabilized on the surface of layer 12 by being baked at 90° C.

After baking, a mask "M" having holes "H" forming a spiral pattern is placed over photoresist layer 52. Photoresist layer 52 is then exposed to ultraviolet light of wavelengths between 260 and 436 nanometers. The ultraviolet light generates a catalyst in the exposed areas "x" of the underlying photoresist layer 52 under the spiral patterned of holes "H". By under-exposing the photoresist layer 52, the deeper regions of the spiral pattern near the edges of the spiral pattern have a lower concentration of the catalyst.

After exposure to light, photoresist layer 52 is baked on a hot plate to activate the catalyst in the spiral pattern 54. The unexposed regions 66 of photoresist layer 52 is then exposed and dissolved and removed by subjecting photoresist layer 52 to a developing solution. The remaining undissolved material forms a spiral resist pattern 54. Because of the under exposure, the sidewalls 64 of resist pattern 54 are undercut at a negative linear slope so that the width "w" decreases with the depth "d" of the pattern 54 as may be seen in FIG. 5b.

Figure 5C:
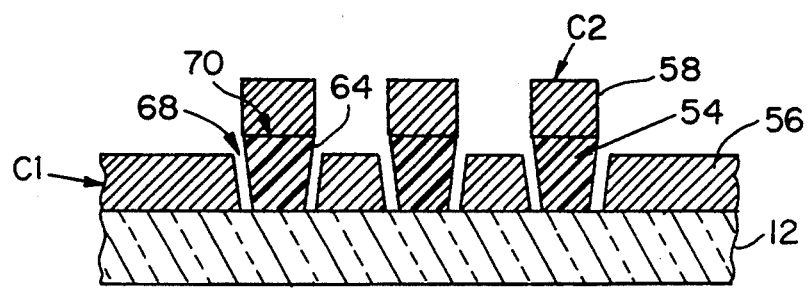
FIG. 5c is a cross-sectional view depicting top and bottom coils deposited on the photoresist pattern and the substrate.

Next, as shown in FIG. 5c, copper is evaporated over photoresist pattern 54 to simultaneously form two multi-layer spiral coils. The metal deposited upon substrate 12 between spiral pattern 54 forms bottom coil C1 having windings 56. The metal deposited upon the upper surface 70 of photoresist pattern 54 forms top coil C1 having windings 58. The undercut sidewalls 64 of pattern 54 causes a shadowing effect so that the deposited metal does not build up at the sidewalls 64 of resist pattern 54. This prevents deposited copper from shorting out the windings 56 and 58. The windings 56 of coil C1 are wider at the base than at the upper surface due to the shadowing effect of the undercut sidewalls 64.

Figure 5D:
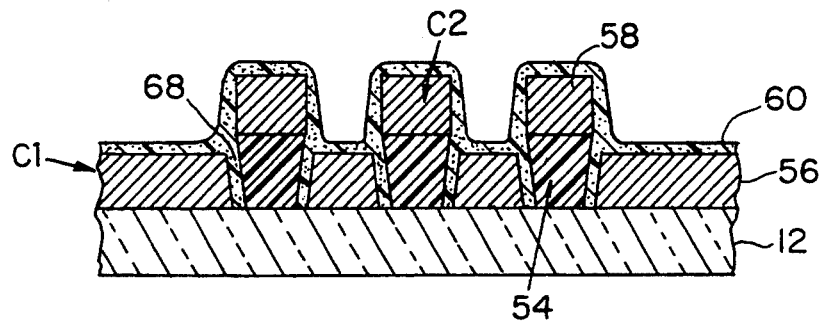
FIG. 5d is a cross-sectional view depicting the top and bottom coils covered with low viscosity photoresist.

Next, as shown in FIG. 5d, a low viscosity insulative photoresist such as AZ1370 is deposited over coils C1 and C2 forming an insulative photoresist layer 60 which covers coils C1 and C2. The low viscosity of the photoresist allows the photoresist to fill in the gaps 68 between windings 56 and sidewalls 64.

Figure 5E:
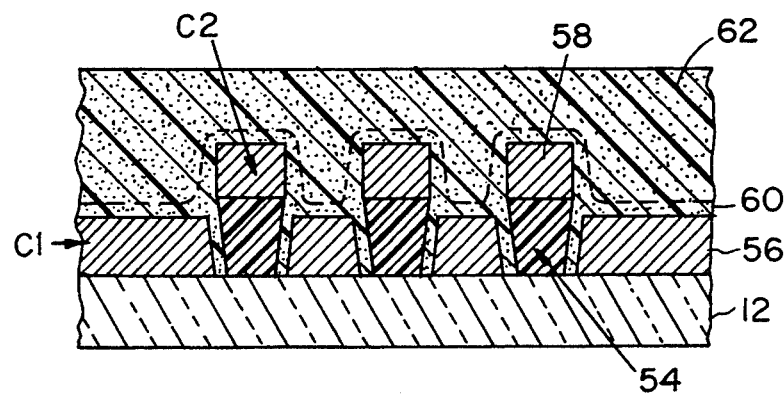
FIG. 5e is a cross-sectional view showing an insulating layer of photoresist covering the top and bottom coils.

In FIG. 5e, a final insulating photoresist layer 62, preferably AZ1375 or AZP4400 is deposited over insulating layer 60 to insulate and protect coils C1 and C2. Photoresist layers 54, 60 and 62 are then hardened by hard bake in a vacuum. Photoresist layers 54, 60 and 62 make up insulating layer 24 (FIGS. 2 and 3). The process depicted in FIGS. 5a-5e can then be repeated to add additional coil layers.

By forming both coils C1 and C2 simultaneously, the number of steps required to manufacture a multi-coil structure is reduced. The reduction of manufacturing steps reduces the time and cost required to manufacture the coils.

Poles 1 and 2 are formed by depositing metal through an additive process.

Figure 6:
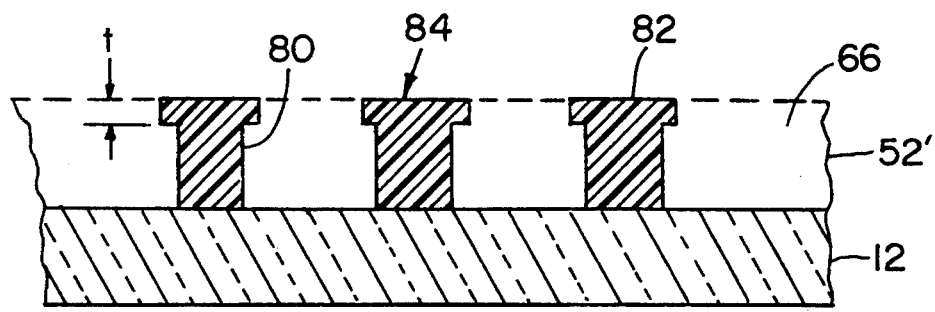
FIG. 6 is a cross-sectional view depicting an alternate photoresist pattern having a stepped sidewall.

FIG. 6 depicts an alternative method of forming the photoresist pattern. A layer of photoresist 52' is applied and baked onto layer 12 in the same manner as depicted in FIG. 5a. However, after baking, an extra step is performed in which the upper surface 84 of photoresist layer 52' is chemically treated to harden only the upper surface 84. The photoresist layer 52' is then masked as before with a spiral pattern mask and exposed to ultraviolet light. When the exposed regions 66 of photoresist layer 52' are dissolved, a spiral photoresist pattern 82 (shown in cross section) having stepped side walls 80 remains. Coils C1 and C2 are then formed over pattern 82 and insulated with photoresist as depicted in FIGS. 5c through 5e to form a multi-coil structure.

In an alternate embodiment, the coils of the present invention can be used as spiral inductors. Additionally, photoresist patterns 54 and 82 can be formed using a multilayer photoresist process.

EQUIVALENTS

While this invention has been particularly shown and described with references to preferred embodiments thereof, it will be understood by those skilled in the art that various changes and form and details may be made therein without departing from the spirit and scope of the invention as defined by the dependent claims.

The invention claimed is:

1. A method of making at least two coils formed of metal windings and wherein a first coil is disposed below a second coil and wherein the windings of the first coil are aligned between, and insulated from, the windings of the second coil comprising the steps of:
   a) forming a first insulative layer;
   b) rendering predetermined areas of the first layer more soluble than other areas and wherein the solubility varies along the thickness of the first layer;
   c) dissolving the more soluble areas of the first layer to produce a pattern of insulation at predetermined locations where the windings for the second coil are to be formed, leaving spaces therebetween, said pattern varying in width from larger to smaller from an upper surface of the first layer to a lower surface;
   d) depositing coil metallization on said pattern such that the windings of the second coil are formed on the top of the pattern and then windings of the first coil are formed in the space between the pattern; and e) forming an insulative layer over the metallization.

2. The method of claim 1 in which the first insulative layer is formed of a resist.

3. The method of claim 2 in which the resist is an image reversal photoresist.

4. The method of claim 3 in which the photoresist is baked a first time prior to exposure and baked a second time after the exposure.

5. The method of claim 1 in which step (e) includes forming a low viscosity resist layer to fill up any voids between the coils and the pattern.

6. The method of claim 1 further comprising forming an upper pole over one portion of the first and second coil windings and a lower pole under adjacent portions of the first and second coil windings.

7. The method of claim 1 in which the first and second coils wind in the same direction.

8. The method of claim 1 further comprising forming a jumper from one end of the second coil winding to an opposite end of the first coil winding.

9. The method of claim 1 in which the first and second coils are spirally wound about a horseshoe shaped magnet formed of an upper pole piece and a lower pole piece separated at one end by a gap.

10. The method of claim 1 further comprising depositing a low viscosity insulator to fill any voids existing between the bottom coil and the sidewalls of the pattern.

11. A method of making multi-layer coils for a magnetic head comprising the steps of:

forming a raised substantially convoluted photoresist pattern, said pattern having a base and an upper surface connected to the base by sidewalls, the upper surface of the pattern being wider across the sidewalls than the base, wherein the width of the base of the pattern is made smaller by under-exposing the photoresist pattern;

depositing a layer of metal over the pattern to form a top coil having windings on the upper surface of the pattern and a bottom coil having windings between the pattern; and depositing an insulator on the top and bottom coils.

12. The method of claim 11 in which the sidewalls of the pattern are linearly sloped.

13. The method of claim 11 further comprising chemically treating the upper surface of the photoresist to harden the upper surface.

14. The method of claim 13 in which the sidewall is formed with a step.

15. The method of claim 11 further comprising:

connecting the top and bottom coils together in electrical series; and connecting the top and bottom coils to an electrical power source.

16. The method of claim 11 in which the top and bottom coils are wound about a core of ferromagnetic material.

17. The method of claim 11 in which the top coil windings are aligned between the bottom coil windings.

18. A method of making multi-layer coils comprising:

forming a raised substantially convoluted photoresist pattern, the convoluted pattern having a base and an upper convoluted surface connected to the base by sidewalls with a lower convoluted surface between and adjacent to the upper convoluted surface wherein the width of the base is made smaller by under-exposing the photoresist pattern;

depositing a layer of metal over the pattern to form a top coil having windings on the upper convoluted surface, the windings of the top coil having a width and a height; and a bottom coil having windings on the lower convoluted surface, the windings of the bottom coil having a width and a height.

19. The method of claim 18 further comprising depositing an insulator on the top and bottom coils.

20. The method of claim 18 in which the cross-sectional width of the bottom coil winding decreases with the height of the bottom coil winding.

21. The method of claim 18 in which the sidewall is linearly sloped.

22. The method of claim 18 further comprising chemically treating the upper surface of the photoresist to harden the upper surface.

23. The method of claim 18 in which the sidewall is formed with a step.

24. The method of claim 18 further comprising depositing a low viscosity insulator to fill any voids existing between the bottom coil and the sidewalls.

25. The method of claim 18 further comprising:

connecting the top and bottom coils together in electrical series; and connecting the top and bottom coils to an electrical power source.

26. The method of claim 18 in which the top and bottom coils are wound about a core of ferromagnetic material.

27. The method of claim 18 in which the top coil windings are aligned between the bottom coil windings.

* * * * *